US009676058B2

(12) United States Patent
Hu et al.

(10) Patent No.: US 9,676,058 B2
(45) Date of Patent: Jun. 13, 2017

(54) METHOD AND SYSTEM FOR DETECTING DRILLING PROGRESS IN LASER DRILLING

(71) Applicant: General Electric Company, Schenectady, NY (US)

(72) Inventors: Zhaoli Hu, Greer, SC (US); Abe Denis Darling, Laurens, SC (US); Shamgar Elijah McDowell, Simpsonville, SC (US); Douglas Anthony Serieno, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 329 days.

(21) Appl. No.: 14/164,522

(22) Filed: Jan. 27, 2014

(65) Prior Publication Data
US 2015/0209901 A1    Jul. 30, 2015

(51) Int. Cl.
| | |
|---|---|
| *B23K 26/00* | (2014.01) |
| *B23K 26/02* | (2014.01) |
| *B23K 26/03* | (2006.01) |
| *B23K 26/08* | (2014.01) |
| *B23K 26/16* | (2006.01) |

(Continued)

(52) U.S. Cl.
CPC ........ *B23K 26/032* (2013.01); *B23K 26/0622* (2015.10); *B23K 26/0869* (2013.01); *B23K 26/146* (2015.10); *B23K 26/16* (2013.01); *B23K 26/388* (2013.01); *B23K 26/40* (2013.01); *B23K 2201/001* (2013.01); *B23K 2203/08* (2013.01); *B23K 2203/50* (2015.10)

(58) Field of Classification Search
CPC ........ B23K 2201/001; B23K 2201/045; B23K 2201/34; B23K 26/00; B23K 26/03–26/032; B23K 26/14; B23K 26/0006; B23K 26/0051; B23K 26/1417; B23K 26/146; B23K 26/388; B23K 26/389
USPC .......................................... 219/121.6–121.86
See application file for complete search history.

(56) References Cited

U.S. PATENT DOCUMENTS 4,027,137 A    5/1977  Liedtke
4,873,414 A   10/1989  Ma et al.
(Continued)

FOREIGN PATENT DOCUMENTS

DE       3643284    12/1986
DE   102005027363    12/2006
(Continued)

OTHER PUBLICATIONS

ISSN 1424-8220 (2012) Pulsed dry laser Camera around Intensity/ shock wave Purcusion drill Experimental trend stop semi-conductor; medical.

(Continued)

*Primary Examiner* — Sang Y Paik
(74) *Attorney, Agent, or Firm* — Dority & Manning, P.A.

(57) ABSTRACT

A method for detecting drilling progress in laser drilling is provided. The method includes sensing a process condition during the drilling of an airfoil, and sensing a change in the process condition indicative of a breakthrough of a laser from the laser drill through a near wall of the airfoil. The method additionally includes continuing to sense the process condition subsequent to the sensed change in the process condition to improve the accuracy of the breakthrough detection.

14 Claims, 10 Drawing Sheets

(51) Int. Cl.
*B23K 26/0622* (2014.01)
*B23K 26/146* (2014.01)
*B23K 26/388* (2014.01)
*B23K 26/40* (2014.01)
B23K 101/00 (2006.01)
B23K 103/08 (2006.01)
B23K 103/00 (2006.01)

(56) References Cited

U.S. PATENT DOCUMENTS

| | | | |
|---|---|---|---|
| 4,905,310 A | 2/1990 | Ulrich | |
| 4,931,615 A | 6/1990 | Muncy et al. | |
| 4,940,880 A | 7/1990 | Klingel et al. | |
| 4,952,771 A | 8/1990 | Wrobel | |
| 4,960,970 A | 10/1990 | Schneiter | |
| 5,026,979 A | 6/1991 | Ortiz, Jr. et al. | |
| 5,045,669 A | 9/1991 | Ortiz, Jr. et al. | |
| 5,182,434 A | 1/1993 | Nakata | |
| 5,222,617 A | 6/1993 | Gregory et al. | |
| 5,367,144 A | 11/1994 | Matsumura et al. | |
| 5,374,803 A | 12/1994 | Yamada | |
| 5,773,791 A | 6/1998 | Kuykendal | |
| 5,902,499 A | 5/1999 | Richerzhagen | |
| 6,001,219 A | 12/1999 | Caspar | |
| 6,140,604 A | 10/2000 | Somers et al. | |
| 6,696,666 B2 | 2/2004 | Merdan et al. | |
| 7,163,875 B2 | 1/2007 | Richerzhagen et al. | |
| 7,728,258 B2 | 6/2010 | Richerzhagen et al. | |
| 8,525,073 B2* | 9/2013 | Quitter | B23K 26/03 219/121.67 |
| 8,581,141 B2 | 11/2013 | Muratsubaki et al. | |
| 8,624,151 B2* | 1/2014 | Elfizy | B23K 26/388 219/121.61 |
| 8,969,760 B2 | 3/2015 | Hu et al. | |
| 2004/0004061 A1* | 1/2004 | Merdan | A61F 2/91 219/121.7 |
| 2004/0102764 A1* | 5/2004 | Balling | A61F 9/008 606/5 |
| 2004/0224179 A1 | 11/2004 | Sokol et al. | |
| 2006/0096964 A1 | 5/2006 | Fordahl | |
| 2007/0193990 A1 | 8/2007 | Richerzhagen et al. | |
| 2007/0278195 A1 | 12/2007 | Richerzhagen et al. | |
| 2009/0001061 A1 | 1/2009 | Beck | |
| 2009/0314753 A1 | 12/2009 | Kosmowski | |
| 2010/0147812 A1 | 6/2010 | Beck et al. | |
| 2010/0147814 A1 | 6/2010 | Watanabe | |
| 2011/0049113 A1 | 3/2011 | Glaesemann et al. | |
| 2011/0076405 A1 | 3/2011 | Raji et al. | |
| 2011/0100965 A1* | 5/2011 | Yano | B23K 26/03 219/121.64 |
| 2011/0240615 A1 | 10/2011 | Suruceanu et al. | |
| 2012/0074105 A1 | 3/2012 | Okamoto et al. | |
| 2013/0020292 A1 | 1/2013 | Elfizy et al. | |
| 2013/0146570 A1 | 6/2013 | Forsman et al. | |
| 2013/0206739 A1 | 8/2013 | Reed et al. | |
| 2013/0298387 A1* | 11/2013 | Kobier | B23K 26/38 29/623.1 |
| 2014/0075755 A1 | 3/2014 | Hu et al. | |
| 2014/0076857 A1 | 3/2014 | Hu et al. | |
| 2014/0076868 A1 | 3/2014 | Hu et al. | |

FOREIGN PATENT DOCUMENTS

| | | |
|---|---|---|
| DE | 102005027363 A1 | 12/2006 |
| EP | 0515983 | 5/1992 |
| EP | 0937533 | 8/1999 |
| EP | 1832376 | 9/2007 |
| EP | 1832376 A2 | 9/2007 |
| EP | 1833636 | 7/2010 |
| GB | 2113592 | 8/1983 |
| GB | 2455538 | 6/2009 |
| GB | 2455538 A | 6/2009 |
| WO | WO 95/32834 | 12/1995 |
| WO | 2006133991 A1 | 12/2006 |
| WO | WO 2006/133991 | 12/2006 |
| WO | WO 2012/037694 | 3/2012 |

OTHER PUBLICATIONS

U.S. Appl. No. 13/617,145, filed on Sep. 14, 2012.
U.S. Appl. No. 13/617,235, filed on Sep. 14, 2012.
A Sweden Office Action issued in connection with corresponding SE Application No. 1550025.9 on Nov. 2, 2015.
U.S. Appl. No. 14/164,522, filed on Jan. 27, 2014.
U.S. Appl. No. 14/104,539, filed on Jan. 27, 2014.
U.S. Appl. No. 14/164,506, filed on Jan. 27, 2014.
Sensors-2012, ISSN 1424-8220; On Line Estimation of Laser-Drilled Hole Depth Using a Machine Vision Method, Chao-Ching Ho, et al. Published Jul. 27, 2012, pp. 10148-10162.

* cited by examiner

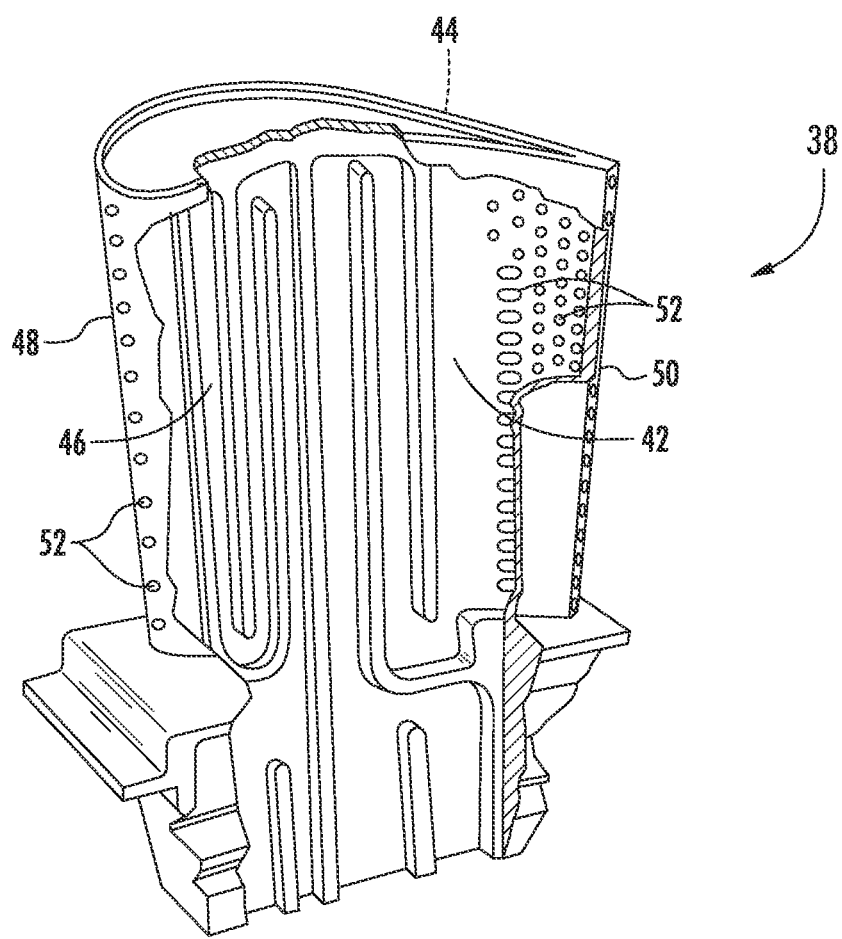
-FIG. 2-

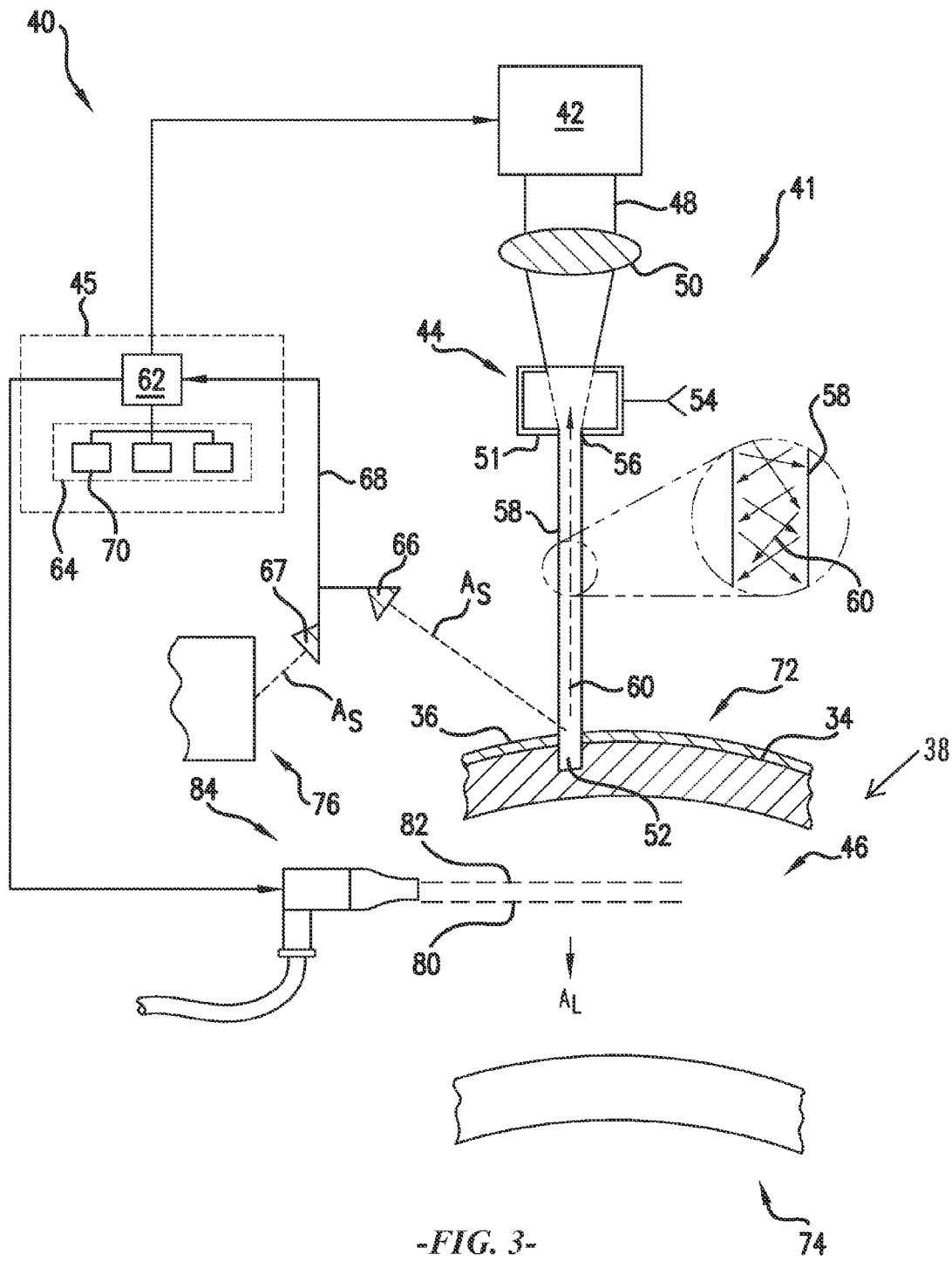
-FIG. 3-

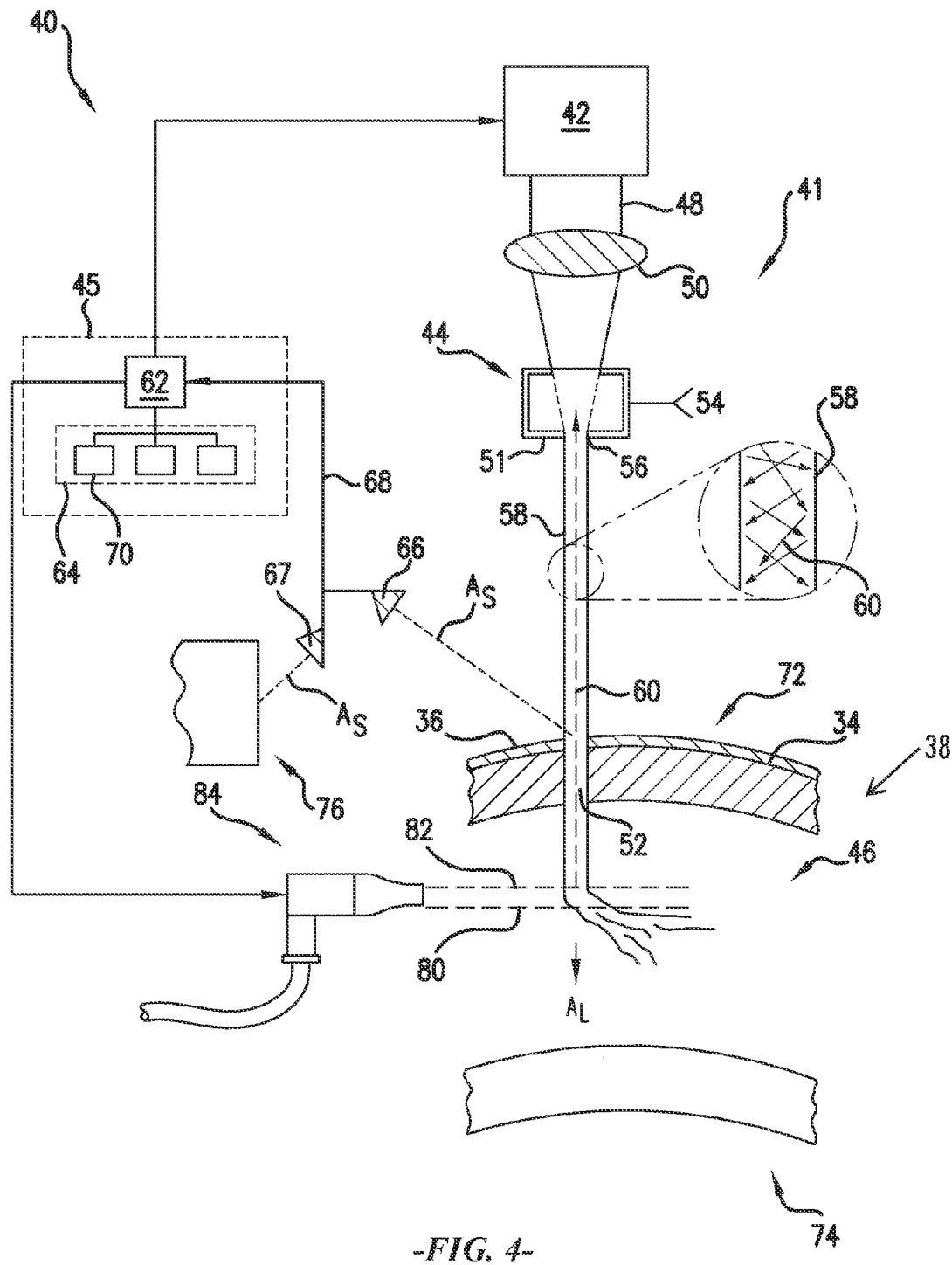
-FIG. 4-

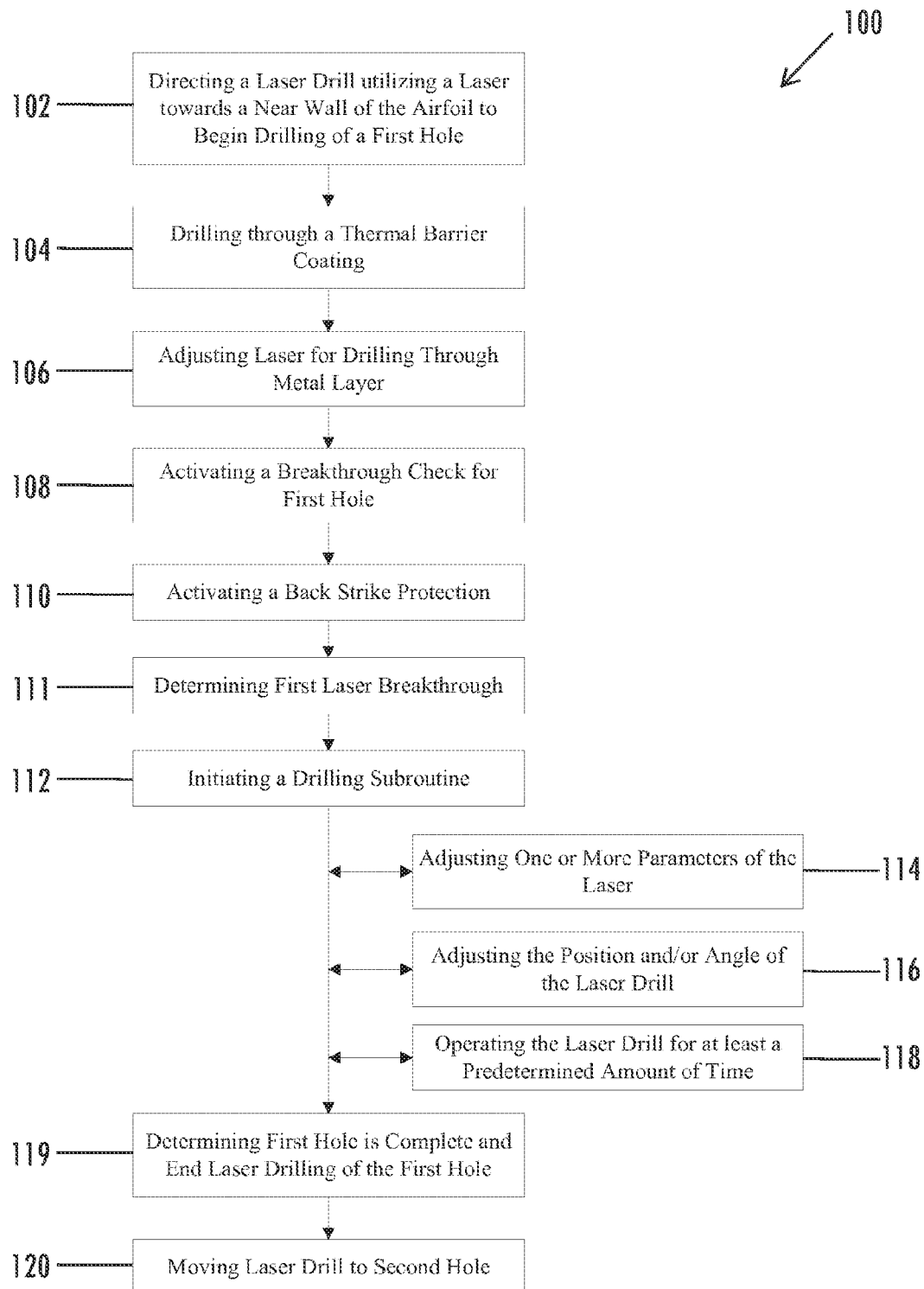
-FIG. 5-

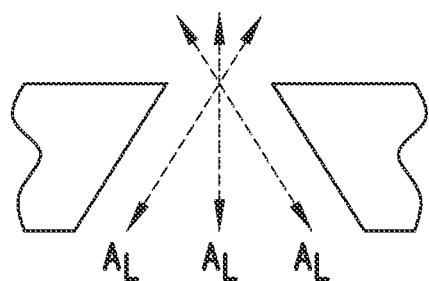
-FIG. 6-
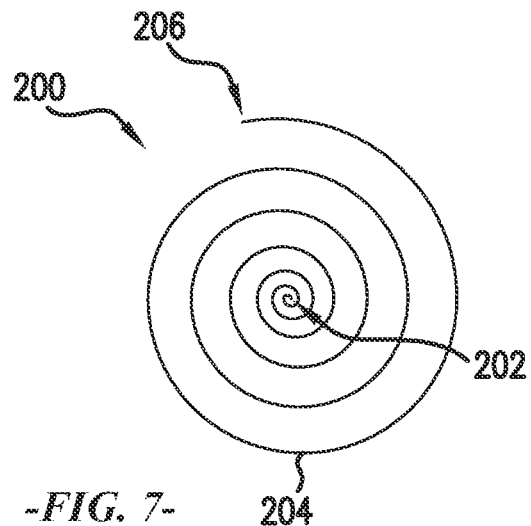
-FIG. 7-
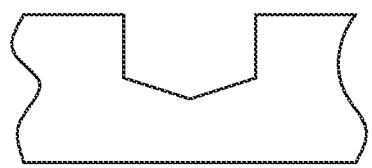
-FIG. 8(a)-
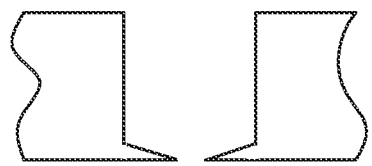
-FIG. 8(b)-
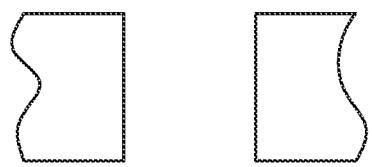
-FIG. 8(c)-

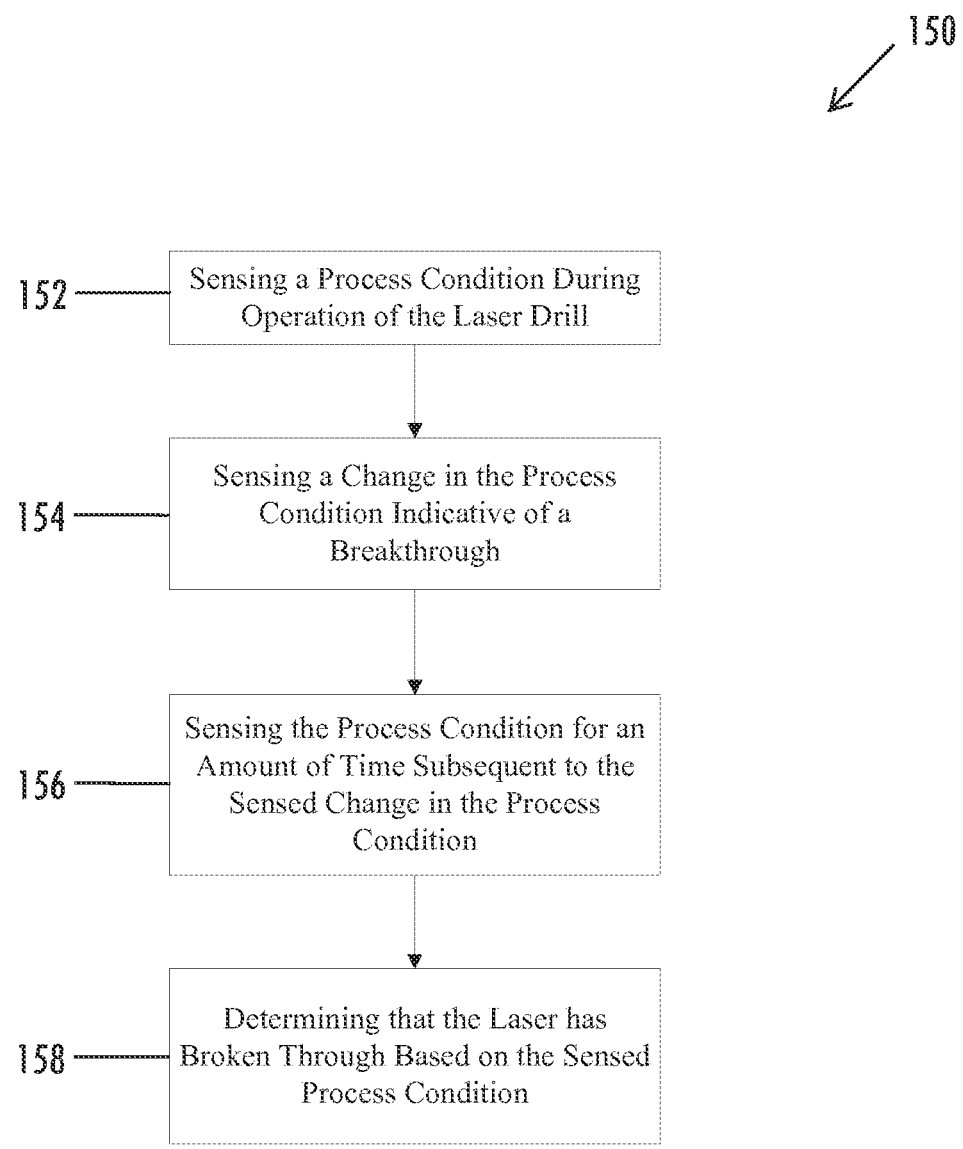
-FIG. 9-

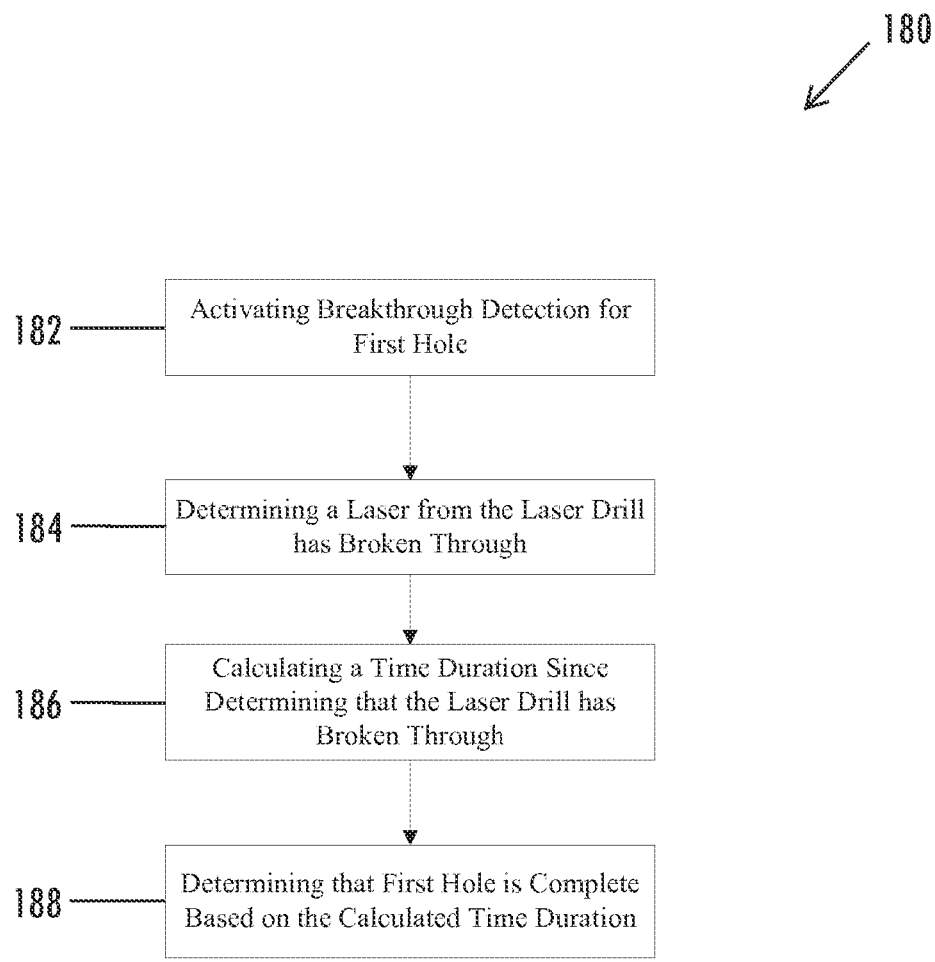
-FIG. 10-

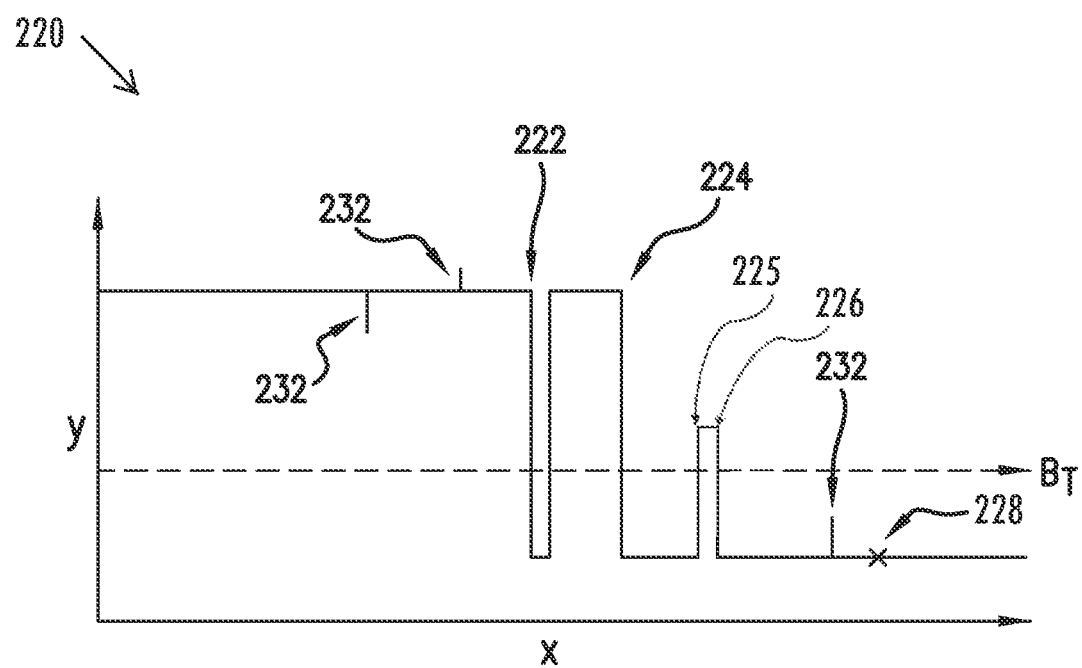
-FIG. 11-

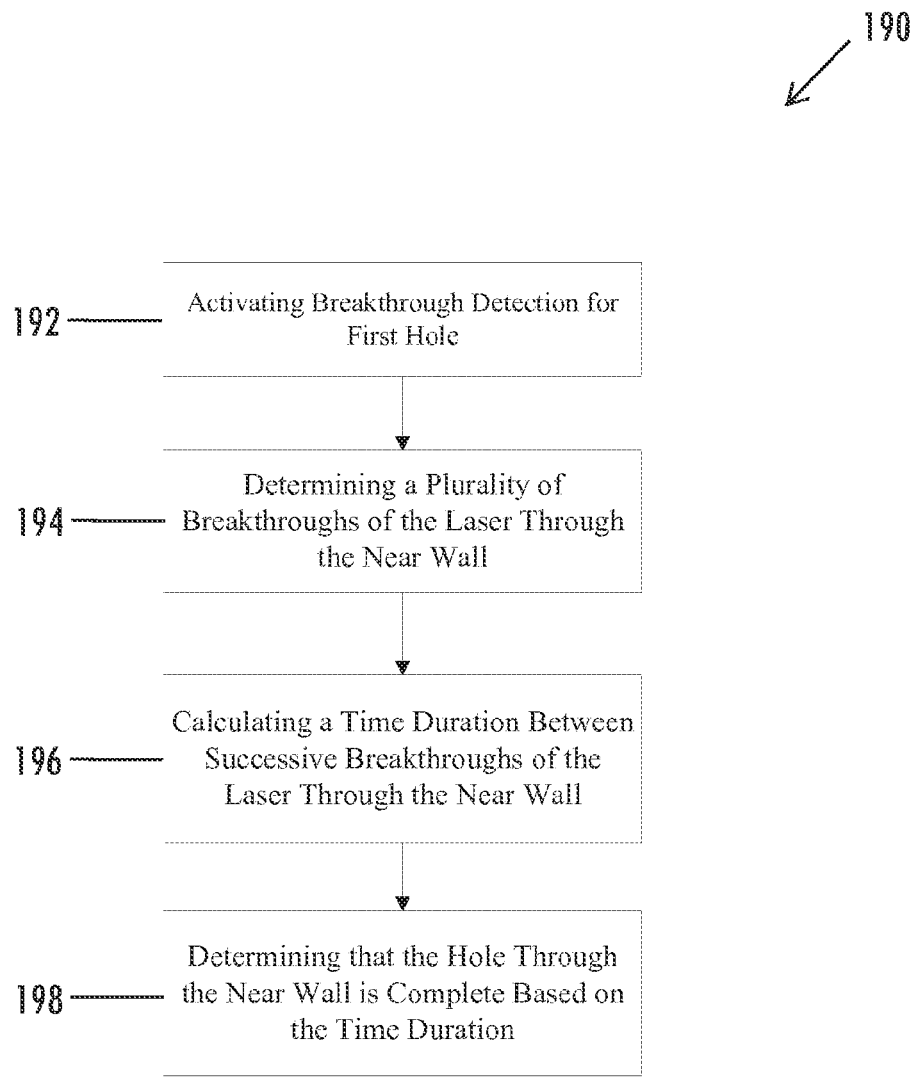
-FIG. 12-

METHOD AND SYSTEM FOR DETECTING DRILLING PROGRESS IN LASER DRILLING

FIELD OF THE INVENTION

The present disclosure generally relates to a method and system for detecting drilling progress in laser drilling.

BACKGROUND OF THE INVENTION

Turbines are widely used in industrial and commercial operations. A typical commercial steam or gas turbine used to generate electrical power includes alternating stages of stationary and rotating airfoils. For example, stationary vanes may be attached to a stationary component such as a casing that surrounds the turbine, and rotating blades may be attached to a rotor located along an axial centerline of the turbine. A compressed working fluid, such as but not limited to steam, combustion gases, or air, flows through the turbine, and the stationary vanes accelerate and direct the compressed working fluid onto the subsequent stage of rotating blades to impart motion to the rotating blades, thus turning the rotor and performing work.

The efficiency of the turbine generally increases with increased temperatures of the compressed working fluid. However, excessive temperatures within the turbine may reduce the longevity of the airfoils in the turbine and thus increase repairs, maintenance, and outages associated with the turbine. As a result, various designs and methods have been developed to provide cooling to the airfoils. For example, a cooling media may be supplied to a cavity inside the airfoil to convectively and/or conductively remove heat from the airfoil. In particular embodiments, the cooling media may flow out of the cavity through cooling passages in the airfoil to provide film cooling over the outer surface of the airfoil.

As temperatures and/or performance standards continue to increase, the materials used for the airfoil become increasingly thin, making reliable manufacture of the airfoil increasingly difficult. For example, the airfoil may be cast from a high alloy metal, and a thermal barrier coating may be applied to the outer surface of the airfoil to enhance thermal protection. A water jet may be used to create cooling passages through the thermal barrier coating and outer surface, but the water jet may cause portions of the thermal barrier coating to chip off. Alternately, the thermal barrier coating may be applied to the outer surface of the airfoil after the cooling passages have been created by the water jet or by an electron discharge machine (EDM), but this requires additional processing to remove any thermal barrier coating covering the newly formed cooling passages.

A laser drill utilizing a focused laser beam may also be used to create the cooling passages through the airfoil with a reduced risk of chipping the thermal barrier coating. The laser drill may utilize a pulsed laser operating at, for example, 5,000 Hz or more. The laser drill, however, may require precise control due to the presence of the cavity within the airfoil. Once the laser drill breaks through a near wall of the airfoil, continued operation of the laser drill by conventional methods may result in damage to an opposite side of the cavity, potentially resulting in a damaged airfoil that must be refurbished or discarded. Accordingly, a sensor, such as a high speed camera having a shutter speed of 110 μs or more, may be used to monitor the laser drill and determine when the laser drill has broken through the near wall of the airfoil. For example, as soon as the camera detects a decrease in an amount of light emanating from where the laser drill is drilling into the airfoil, potentially indicating a breakthrough, conventional laser drills are configured to stop drilling immediately in order to minimize the risk of damaging the airfoil. However, such a method may be inaccurate as the drilling status is determined using a small number of data points. For example, the first frame from the camera that is processed indicating a decrease in the amount of light emanating from where the drill is drilling may trigger the drill to cease operation. Said frame, however, may have been taken between pulses of the laser or otherwise included noise decreasing the accuracy of the measurement. Moreover, such a method requires heavy processing in order to process the large number of frames per second and quickly determine the status of the laser drill.

Accordingly, a method for providing more accurate information regarding the status of the laser drill would be beneficial. In addition, a method of determining the status of the laser drill requiring less processing would be particularly useful.

BRIEF DESCRIPTION OF THE INVENTION

Aspects and advantages of the invention are set forth below in the following description, or may be obvious from the description, or may be learned through practice of the invention.

In one exemplary aspect of the present disclosure, a method is provided for determining a breakthrough of a laser drill through a near wall of an airfoil. The method includes drilling a hole in the near wall of the airfoil using the laser drill, the airfoil defining a cavity adjacent to the near wall and the laser drill utilizing a laser. The method also includes sensing a process condition and sensing a change in the process condition in excess of a predefined threshold, the sensed change indicative of a breakthrough of the laser through the near wall of the airfoil. Additionally, the method includes sensing the process condition for an amount of time subsequent to the sensed change in the process condition to collect additional data, and determining that the laser has broken through the near wall of the airfoil based on the sensed process condition.

In another exemplary embodiment of the present disclosure a system is provided for determining a breakthrough in laser drilling of an airfoil. The system includes a laser drill, the laser drill utilizing a pulsed laser beam defining a pulse frequency and a drilling axis and configured to drill through a near wall of the airfoil. The system also includes a sensor, the sensor sensing a process condition indicative of the status of the laser drill at a frequency less than the pulse frequency of the laser drill. Additionally, the system includes a back strike protection mechanism configured to protect a cavity defined in the airfoil from the laser drill, the cavity positioned adjacent to the near wall of the airfoil.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 2 is a perspective view of an exemplary airfoil according to an embodiment of the present disclosure;

FIG. 3 is a perspective view of a system for manufacturing the airfoil shown in FIG. 2 according to one embodiment of the present disclosure;

FIG. 4 is a perspective view of the system of FIG. 3 after a confined laser beam has broken through a near wall of the airfoil;

FIG. 5 is a block diagram illustrating a method for manufacturing an airfoil in accordance with an exemplary aspect of the present disclosure;

FIG. 6 is a side cross-sectional view of a hole drilled in the near wall of the airfoil in accordance with an exemplary embodiment of the present disclosure;

FIG. 7 is an overhead view of a drilling pattern for the laser drill in accordance with an exemplary aspect of the present disclosure;

FIG. 8(a) is a side cross-sectional view of an exemplary hole in the near wall of the airfoil while the hole is being drilled and prior to the laser having broken through;

FIG. 8(b) is a side cross-sectional view of the exemplary hole of FIG. 8(a) after a first breakthrough of the laser, but prior to the hole being completed;

FIG. 8(c) is a side cross-sectional view of the exemplary hole of FIG. 8(a) after being completed;

FIG. 9 is a block diagram illustrating a method for determining a breakthrough of a laser from the laser drill in the near wall of the airfoil in accordance with an exemplary aspect of the present disclosure;

FIG. 10 is a block diagram illustrating a method for determining that the drilling of the first hole in the airfoil is complete in accordance with an exemplary aspect of the present disclosure;

FIG. 11 is a graph illustrating the value of a sensed process condition during the drilling of the first hole in the near wall of the airfoil in accordance with an exemplary aspect of the present disclosure; and FIG. 12 is a block diagram illustrating another method for determining that the drilling of the first hole in the airfoil is complete in accordance with an exemplary aspect of the present disclosure.

DETAILED DESCRIPTION OF THE INVENTION

Figure 1:
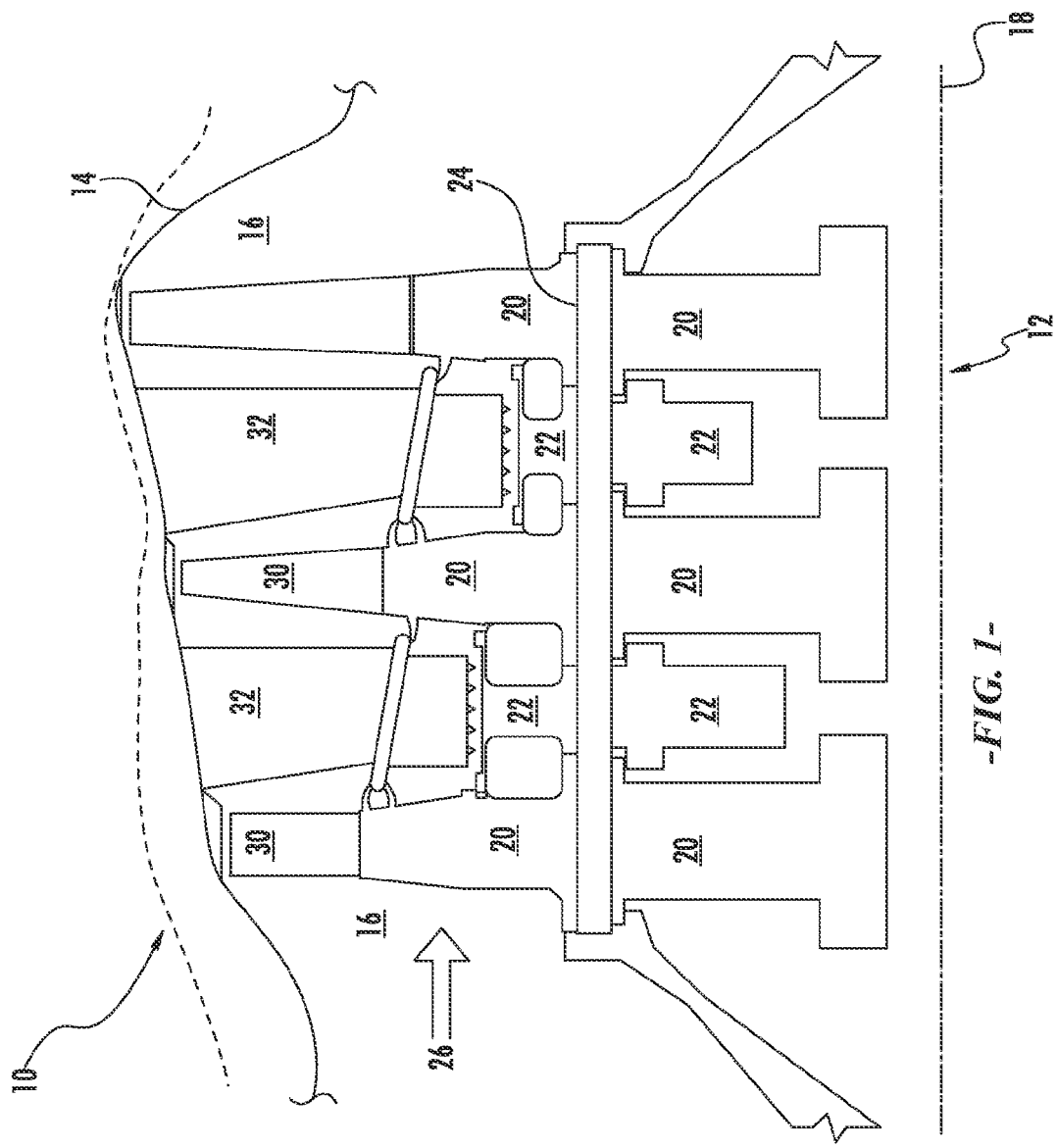
FIG. 1 is a simplified cross-sectional view of an exemplary turbine that may incorporate various embodiments of the present disclosure.

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents. Although exemplary embodiments of the present disclosure will be described generally in the context of manufacturing an airfoil for a turbomachine for purposes of illustration, one of ordinary skill in the art will readily appreciate that embodiments of the present disclosure may be applied to other articles of manufacture and are not limited to a method for manufacturing an airfoil for a turbomachine unless specifically recited in the claims. For example, in other exemplary embodiments, aspects of the present disclosure may be used to manufacture an airfoil for use in the aviation context.

As used herein, the terms "first", "second", and "third" may be used interchangeably to distinguish one component from another and are not intended to signify location or importance of the individual components. Similarly, the terms "near" and "far" may be used to denote relative position of an article or component and are not intended to signify any function or design of said article or component.

Referring now to the drawings, FIG. 1 provides a simplified side cross-section view of an exemplary turbine 10 according to various embodiments of the present disclosure. As shown in FIG. 1, the turbine 10 generally includes a rotor 12 and a casing 14 that at least partially define a gas path 16 through the turbine 10. The rotor 12 is generally aligned with an axial centerline 18 of the turbine 10 and may be connected to a generator, a compressor, or another machine to produce work. The rotor 12 may include alternating sections of rotor wheels 20 and rotor spacers 22 connected together by a bolt 24 to rotate in unison. The casing 14 circumferentially surrounds at least a portion of the rotor 12 to contain a compressed working fluid 26 flowing through the gas path 16. The compressed working fluid 26 may include, for example, combustion gases, compressed air, saturated steam, unsaturated steam, or a combination thereof.

As shown in FIG. 1, the turbine 10 further includes alternating stages of rotating blades 30 and stationary vanes 32 that extend radially between the rotor 12 and the casing 14. The rotating blades 30 are circumferentially arranged around the rotor 12 and may be connected to the rotor wheels 20 using various means. In contrast, the stationary vanes 32 may be peripherally arranged around the inside of the casing 14 opposite from the rotor spacers 22. The rotating blades 30 and stationary vanes 32 generally have an airfoil shape, with a concave pressure side, a convex suction side, and leading and trailing edges, as is known in the art. The compressed working fluid 26 flows along the gas path 16 through the turbine 10 from left to right as shown in FIG. 1. As the compressed working fluid 26 passes over the first stage of rotating blades 30, the compressed working fluid expands, causing the rotating blades 30, rotor wheels 20, rotor spacers 22, bolt 24, and rotor 12 to rotate. The compressed working fluid 26 then flows across the next stage of stationary vanes 32 which accelerate and redirect the compressed working fluid 26 to the next stage of rotating blades 30, and the process repeats for the following stages. In the exemplary embodiment shown in FIG. 1, the turbine 10 has two stages of stationary vanes 32 between three stages of rotating blades 30; however, one of ordinary skill in the art will readily appreciate that the number of stages of rotating blades 30 and stationary vanes 32 is not a limitation of the present disclosure unless specifically recited in the claims.

FIG. 2 provides a perspective view of an exemplary airfoil 38, such as may be incorporated into the rotating blades 30 or stationary vanes 32, according to an embodiment of the present disclosure. As shown in FIG. 2, the airfoil 38 generally includes a pressure side 42 having a concave curvature and a suction side 44 having a convex curvature and opposed to the pressure side 42. The pressure and suction sides 42, 44 are separated from one another to define a cavity 46 inside the airfoil 38 between the pressure and suction sides 42, 44. The cavity 46 may provide a serpentine or tortuous path for a cooling media to flow inside the airfoil 38 to conductively and/or convectively remove heat from the airfoil 38. In addition, the pressure and suction sides 42, 44 further join to form a leading edge 48 at an upstream portion of the airfoil 38 and a trailing edge 50 downstream from the cavity 46 at a downstream portion of the airfoil 38. A plurality of cooling passages 52 in the pressure side 42, suction side 44, leading edge 48, and/or trailing edge 50 may provide fluid communication from the cavity 46 through the airfoil 38 to supply the cooling media over the outer surface of the airfoil 38. As shown in FIG. 2, for example, the cooling passages 52 may be located at the leading and trailing edges 48, 50 and/or along either or both of the pressure and suction sides 42, 44. One of ordinary skill in the art will readily appreciate from the teachings herein that the number and/or location of the cooling passages 52 may vary according to particular embodiments, as may the design of the cavity 46. Accordingly, the present disclosure is not limited to any particular number or location of cooling passages 52 or cavity 46 design unless specifically recited in the claims.

In certain exemplary embodiments, a thermal barrier coating 36 may be applied over at least a portion of an outer surface 34 of the airfoil 38 (see FIGS. 3 and 4). The thermal barrier coating 36, if applied, may include low emissivity or high reflectance for heat, a smooth finish, and/or good adhesion to the underlying outer surface 34.

Referring now to FIGS. 3 and 4, a perspective view of an exemplary system 40 of the present disclosure is provided. As will be discussed in greater detail below with reference to FIGS. 5 through 12, the system 40 may be used in, for example, the manufacturing of the airfoil 38, or more particularly, in the drilling of one or more holes or cooling passages 52 in the airfoil 38.

The exemplary system 40 may include a laser drill 41 configured to direct a confined laser beam 60 towards a near wall 72 of the airfoil 38, the confined laser beam 60 defining an axial direction $A_L$. More particularly, various embodiments of the laser drill 41 may generally include a laser 42, a collimator 44, and a controller 45. The laser 42 may include any device capable of generating a laser beam 48. By way of example only, in certain exemplary embodiments, the laser 42 may be an optically pumped Nd:YAG laser capable of producing an unfocused laser beam at a pulse frequency of approximately 10-50 kHz, a wavelength of approximately 500-550 nm, and an average power of approximately 10-100 W.

In the particular embodiment shown in FIGS. 3 and 4, the laser 42 directs the laser beam 48 through a lens 50 to the collimator 44. As used herein, the collimator 44 includes any device that narrows and/or aligns a beam of particles or waves to cause the spatial cross section of the beam to become smaller. For example, as shown in FIGS. 3 and 4, the collimator 44 may include a chamber 51 that receives the laser beam 48 along with a fluid 54, such as deionized or filtered water. An aperture or nozzle 56 having a diameter of approximately 20-150 microns directs the laser beam 48 inside a fluid column 58 toward the airfoil 38. The fluid column 58 may have a pressure of approximately 700-1,500 pounds per square inch. However, the present disclosure is not limited to any particular pressure for the fluid column 58 or diameter for the nozzle 56 unless specifically recited in the claims.

As shown in the enlarged view in FIGS. 3 and 4, the fluid column 58 may be surrounded by air and act as a light guide for the laser beam 48 to create a focused or confined laser beam 60 directed at the airfoil 38. In certain exemplary embodiments of the present disclosure, the confined laser beam 60 may be a water guided laser beam and the laser drill 41 may be a water guided laser beam drill. The confined laser beam 60 may ablate the outer surface 34 of the airfoil 38, eventually creating the desired cooling passage 52 through the airfoil 38. Notably, FIG. 3 depicts the system 40 prior to the laser beam 60 "breaking through" the near wall 72 of the airfoil 38, while FIG. 4 depicts the system 40 subsequent to the laser beam 60 having broken through the near wall 72 of the airfoil 38.

As used herein, the term "breakthrough," "breaking through," and cognates thereof refer to when the laser 60 has removed a continuous portion of the material comprising the near wall 72 of the airfoil 38 present along the axis $A_L$ of the laser 60, such that at least a portion of said laser 60 may pass therethrough into, for example, the cavity 46 of the airfoil 38. Moreover, breakthrough may be used to describe the act of the laser removing a last portion of the near wall 72 and first passing through the near wall 72, or alternatively to describe any continuous amount of time in which the laser has been passing through the near wall 72 of the airfoil 38.

With continued reference to FIGS. 3 and 4, the system 40 further includes an exemplary back strike protection system 84. The exemplary back strike protection system 84 includes a gas 80 flowing inside the airfoil 38. As used herein, the term "gas" may include any gaseous media. For example, the gas 80 may be an inert gas, a vacuum, a saturated steam, a superheated steam, or any other suitable gas that may form a gaseous column 82 inside the cavity 46 of the airfoil 38. The gas 80 flowing inside the airfoil 38 may have a pressure roughly commensurate with the pressure of the gas or liquid in the fluid column 58 and sufficient to disrupt the fluid column 58 inside the cavity 46 of the airfoil 38. For example, in certain exemplary embodiments, the gas 80 flowing inside the airfoil 38 may have a pressure greater than approximately 25 pounds per square inch, although the present disclosure is not limited to any particular pressure for the gas 80 unless specifically recited in the claims.

As shown most clearly in FIG. 4, the gas 80 may be aligned to intersect with the fluid column 58 and/or confined laser beam 60 inside the cavity 46 of the airfoil 38. In particular embodiments, the gas 80 may be aligned substantially perpendicular to the fluid column 58, while in other particular embodiments, the gas 80 may be aligned at an oblique or acute angle with respect to the fluid column 58 and/or confined laser beam 60. As the gas 80 intersects with the fluid column 58 inside the airfoil 38, the gas 80 disrupts the fluid column 58 and/or scatters the confined laser beam 60 inside the cavity 46 of the airfoil 38. In this manner, the gas 80 prevents the confined laser beam 60 from striking an inside surface of the cavity 46 of the airfoil 38 opposite from the newly formed cooling passage 52 in the near wall 72.

The exemplary system 40 of FIGS. 3 and 4 additionally includes a sensor 66 and a sensor 67 operably connected with the controller 45 and configured to send a signal 68 to the controller 45. In certain exemplary embodiments, the sensors 66, 67 may be a camera, a microphone, a photo diode, a fluid sensor, or any other sensor suitable for monitoring a process condition of the laser drill 41. For example, when one or more of the sensors 66, 67 is a camera, the one or more sensors 66, 67 may detect an amount of light, an intensity of light, or both emanating from a drilling point, i.e., where the axis $A_L$ defined by the laser beam 60 intersects the near wall 72 of the airfoil 38. More particularly, in such an embodiment, the sensor 66 may sense light directly emanating from the drilling point, whereas the sensor 67 may detect light on an ambient surface 76 that has been reflected from the drilling point. As used herein, ambient surface refers to any surface in the environment of the system 40 with a line of sight to the drilling point. Moreover, in such an exemplary embodiment, the camera may have a shutter speed of 100 frames per second or less, or alternatively, may have a shutter speed of 80 frames per second or less, 40 frames per second or less, or 20 frames per second or less. However, the present disclosure is not limited to any particular sensor type or camera shutter speed unless specifically limited by the claims.

Additionally, it should be appreciated that in other exemplary embodiments of the present disclosure, the system 40 may only include one sensor positioned in either location described above, or in any other suitable location to monitor a process condition of the system 40. For example, in other embodiments, a single sensor may be placed within the cavity 46 of the airfoil, configured to detect light, fluid or any other condition.

Referring still to the exemplary system 40 of FIGS. 3 and 4, the controller 45 may be any suitable processor-based computing device, and may be in operable communication with the laser drill 41, the sensors 66 and 67, and the back strike protection system 84. For example, suitable controllers 45 may include personal computers, mobile phones (including smart phones), personal digital assistants, tablets, laptops, desktops, workstations, game consoles, servers, other computers and/or any other suitable computing devices. As shown in FIGS. 3 and 4, the controller 45 may include one or more processors 62 and associated memory 64. The processor(s) 62 may generally be any suitable processing device(s) known in the art. Similarly, the memory 64 may generally be any suitable computer-readable medium or media, including, but not limited to, RAM, ROM, hard drives, flash drives, or other memory devices. As is generally understood, the memory 64 may be configured to store information accessible by the processor(s) 62, including instructions or logic 70 that can be executed by the processor(s) 62. The instructions or logic 70 may be any set of instructions that when executed by the processor(s) 62 cause the processor(s) 62 to provide a desired functionality. For instance, the instructions or logic 70 can be software instructions rendered in a computer-readable form. When software is used, any suitable programming, scripting, or other type of language or combinations of languages may be used to implement the teachings contained herein. In particular embodiments of the present disclosure, for example, the instructions or logic 70 may be configured to implement one or more of the methods described below with reference to FIGS. 5, 9, 10 and 12. Alternatively, the instructions can be implemented by hard-wired logic 70 or other circuitry, including, but not limited to application-specific circuits.

Referring now to FIG. 5, a flow diagram of an exemplary method of manufacturing an airfoil is provided. More particularly, the flow diagram of FIG. 5 illustrates an exemplary method 100 for drilling a hole in an airfoil.

The method at 102 includes directing a laser drill towards a near wall of the airfoil to begin drilling a first hole. The method at 102 may further include starting the laser drill and drilling into the near wall of the airfoil. The laser drill may define a starting position relative to the airfoil and a drilling angle between an axis of the laser and the near wall of the airfoil. The first hole may be a cooling passage in the near wall of the airfoil and the airfoil may be configured for use in a turbine of a turbomachine. The near wall may be positioned adjacent to a cavity defined in the airfoil and the airfoil may additionally include a far wall positioned opposite the cavity from the near wall. The laser drill may be any suitable laser drill utilizing a laser. For example, in certain exemplary aspects of the present disclosure, the laser drill directed towards the near wall of the airfoil at 102 may be the laser drill described above with reference to FIGS. 3 and 4, utilizing a pulsed laser and confined laser beam.

The exemplary method 100 further includes drilling through the thermal barrier coating of the airfoil at 104 and adjusting the laser for drilling through an underlying metal layer of the airfoil at 106. Adjusting the laser at 106 may include adjusting one or more parameters of the laser, such as, for example, the power, pulse rate, frequency, fluid pressure, wavelength, etc. It may be desirous to adjust other parameters as well. The laser drill may be adjusted for drilling through the metal layer after a predetermined amount of time from the start of the drilling the first hole, or alternatively, the laser drill may be adjusted based on a sensed process condition from one or more sensors indicating that the laser drill has drilled through the thermal barrier coating. It should be appreciated, however, that in other exemplary aspects of the present disclosure, the method 100 may not include 104 and/or 106. For example, in certain exemplary embodiments, the airfoil may not include a thermal barrier coating or the same settings for the laser may be used for drilling through the thermal barrier coating and the underlying layer.

With continued reference to FIG. 5, the method 100 further includes activating a breakthrough check for the first hole at 108, activating a back strike protection in the cavity of the airfoil at 110, and determining a first breakthrough of the laser of the laser drill through the near wall of the airfoil at 111.

The breakthrough check at 108 may ensure that a first breakthrough is determined at 111 within a predetermined amount of time from the start of the drilling the first hole, or alternatively from the start of drilling through the underlying metal layer of the airfoil. Similarly, as will be discussed below, the breakthrough check at 108 may ensure the hole completion is determined at 119 within a predetermined amount of time. The predetermined amount of time for each of these events may be dependent on, for example, the hole being drilled, the airfoil, the location of the hole in the airfoil, or a combination thereof. Generally, the predetermined amount of time will be longer than an expected amount of time for the event. For example, in certain exemplary embodiments, the predetermined amount of time may be a fixed amount of time after the expected breakthrough or completion (e.g., five (5) seconds longer or ten (10) seconds longer), or alternatively may be a percentage of the expected amount of time (e.g., twenty percent (20%) longer or thirty percent (30%) longer). If the breakthrough and/or hole completion is not determined at 111 or 119, respectively, within the predetermined amount of time, then the method 100 may stop the laser drill and/or notify an operator, as there may be a problem with a sensor, the laser drill, or both. Alternatively, the method 100 may include attempting automatically to diagnose the issue and remedy the issue by, for example, purging a fluid stream for the confined laser beam prior to stopping the laser drill.

The back strike protection activated at 110 may be any suitable back strike protection method or mechanism configured to protect the cavity of the airfoil from a laser from the laser drill. In one exemplary aspect, for example, the back strike protection activated at 110 may be the back strike protection mechanism 84 described above with reference to FIGS. 3 and 4. In such an exemplary embodiment, activating the back strike protection at 110 may include flowing a fluid through the cavity of the airfoil to disrupt a fluid column and/or the confined laser beam from the laser drill. Additionally, the back strike protection may be activated at 110 based on a sensed process condition, or alternatively may be activated automatically after a predetermined amount of time from, e.g., the start of the drilling of the first hole, or from the start of drilling through the underlying metal layer of the airfoil. Similar to the breakthrough check at 108, the predetermined amount of time to activate the back strike protection at 110 may be dependent on, for example, the hole being drilled, the airfoil, the location of the hole in the airfoil, or a combination thereof. For example, in certain exemplary embodiments, the predetermined amount of time may be a fixed amount of time relative to the expected breakthrough (e.g., five (5) seconds shorter or ten (10) seconds shorter), or alternatively may be a percentage of the expected amount of time (e.g., twenty percent (20%) shorter or thirty percent (30%) shorter).

As stated, the exemplary method 100 further includes determining the first breakthrough of the laser through the near wall of the airfoil at 111. The exemplary method 100 may utilize any suitable method or system for determining the first breakthrough at 111. For example, in certain exemplary embodiments, the method 100 may utilize at 111 one or more aspects of the method 150 for determining the drilling progress, described in greater detail below with reference to FIG. 9.

Referring still to FIG. 5, subsequent to determining the breakthrough of the laser drill through the near wall of the airfoil at 111, the method 100 includes at 112 initiating a drilling subroutine. The drilling subroutine may include a continued operation of the laser drill, or more particularly, a continued operation of the laser drill in drilling the first hole. As such, the method 100 may include completing the drilling of the first hole in the near wall of the airfoil utilizing the drilling subroutine. Such a process may result in a more complete hole, or cooling passage, in the airfoil, allowing for improved fluid flow of cooling media therethrough during usage of the airfoil in, for example, a turbine in a turbomachine.

For the exemplary method 100 of FIG. 5, initiating the drilling subroutine at 112 may include adjusting one or more parameters of the laser at 114. The one or more parameters of the laser may include, for example, a pulse rate, frequency, fluid pressure, wavelength, power, or a combination thereof. For example, it may be desirous to decrease the strength of the laser utilized by the laser drill when nearing completion of the hole by decreasing, for example, the power and pulse rate of the laser. Moreover, wherein the laser is a confined laser beam, it may be desirous to correspondingly decrease the fluid pressure of the fluid column. Such a decrease may reduce a risk of damage to the cavity of the airfoil after the laser has broken through the near wall, but prior to the first hole being completed.

Additionally, or alternatively, initiating the drilling subroutine at 112 may include adjusting a position of the laser drill, an angle of the laser drill, or both, at 116. More particularly, the drilling subroutine may include at 116 moving the laser drill from the starting position, or first position, to a second position in order to shape the geometry of the first hole. The drilling subroutine may also include at 116 adjusting the drilling angle of the laser drill (i.e., the angle defined between the axis of the laser and the surface of the near wall of the airfoil). By adjusting the angle of the laser drill relative to the airfoil, the position of the laser drill relative to the airfoil, or both, the geometry of the first hole may be optimized to allow for improved fluid flow of cooling media therethrough. For example, by adjusting the angle of the laser drill relative to the airfoil, the position of the laser drill relative to the airfoil, or both, a frustoconical shaped hole such as the one depicted in FIG. 6 may be drilled. For the exemplary embodiment of FIG. 6, $A_L$ represents the various positions and angles the laser drill may operate. Notably, in such an exemplary embodiment, the laser drill may be capable of moving forward, backward, left, right, up, down, and angularly relative to the airfoil.

Furthermore, initiating the drilling subroutine at 112 may include at 118 operating the laser drill for a predetermined amount of time. The predetermined amount of time may be any amount of time that has been determined to be sufficient for the laser drill to substantially complete the first hole and may be dependent on, for example, the airfoil, the location of the hole in the airfoil, the particular hole being drilled, etc. As used herein, "substantially complete" refers to the hole or cooling passage having a desired geometry. For example, the hole may be substantially complete once the hole has a cylindrical shape with a consistent diameter throughout, such as the hole depicted in the near wall in FIG. 4, or having a frustoconical shape, such as the hole depicted in FIG. 6.

It should be appreciated, however, that the exemplary method 100 may include at 112 any combination of 114, 116, and 118. For example, the exemplary method 100 may include 114, 116, and 118 sequentially, simultaneously, or in any other order. Moreover, it should be appreciated that in other exemplary aspects of the present disclosure, the exemplary method 100 may additionally or alternatively include initiating any other appropriate drilling subroutine at 112. For example, the method 100 may include any other drilling subroutine at 112 configured to contribute to the completion of the drilling of the first hole in the near wall of the airfoil by calling for continued operation of the laser drill. Additionally, in other exemplary aspects of the method 100, the drilling subroutine initiated at 112 may include initiating or adjusting other aspects of the system, such as, for example, activating or adjusting the fluid pressure of the back strike protection. In such an exemplary aspect, the exemplary method 100 may not necessarily include 110.

It should also be appreciated that in other exemplary aspects of the present disclosure, the exemplary method 100 may include the above steps in any suitable order and/or simultaneously with one another. Moreover, the exemplary method 100 may include additional steps as appropriate. For example, in other exemplary aspects of the present disclosure, the exemplary method 100 may additionally include moving the laser drill in a pattern relative to the airfoil while drilling the first hole. The pattern may be a spiral pattern 200, such as the pattern depicted in FIG. 7. In such an embodiment, the laser drill may move from a center position 202 along a spiral line 204 until it reaches an end point 206. Once the laser drill reaches the end point 206, the laser drill may move back along the spiral line 204 to the center 202, may start back at the center 202, or alternatively may move back towards the center 202 along a spiral path inverted from the one depicted in FIG. 7. By moving the laser drill in the spiral pattern 200 relative to the airfoil, the laser drill may drill a hole in the near wall of the airfoil with a lower aspect ratio (i.e., ratio of the height to width of the hole), while minimizing the risk that portions of the wall fall into the cavity, potentially causing damage to the airfoil. Drilling a hole in a spiral drilling pattern may produce a hole having the cross sections shown in FIGS. 8(*a*), 8(*b*), and 8(*c*) through the drilling process. More particularly, the hole may have the cross-section of FIG. 8(*a*) prior to the laser breaking through the near wall; the cross-section of FIG. 8(b) after the laser has first broken through the near wall, but prior to the hole being completed; and the cross-section of FIG. 8(c) after the hole has been completed. Accordingly, in such an exemplary aspect, the method 100 may further include at 111 determining a plurality of breakthrough and at 112 initiating a drilling subroutine after one or more of said breakthroughs. Moreover, such an exemplary aspect may further include moving a sensor, such as the sensor 66 depicted in FIGS. 3 and 4, to correspond to the movement of the laser drill.

With continued reference to FIG. 5, the exemplary method 100 further includes determining the first hole is complete and ending the laser drilling of the first hole at 119 and at 120 moving the laser drill relative to the airfoil to a second hole. The method 100 may utilize any appropriate means for determining the hole is complete at 119. For example, in certain exemplary aspects of the present disclosure the method 100 may utilize one or more aspects of the method 180 described below with reference to FIG. 10 or one or more aspects of a method 190, described below with reference to FIG. 12. It should be appreciated, however, that in other exemplary aspects, the method 100 may not include 119 and/or 120.

Referring now to FIG. 9, a flow diagram of an exemplary method 150 for determining a drilling progress is provided. More particularly, the flow diagram of FIG. 9 illustrates an exemplary method 150 for determining a breakthrough of a laser through a near wall of an airfoil.

The exemplary method 150 includes at 152 sensing a process condition during operation of the laser drill. The sensed process condition may be any measurable condition indicative of the progress or status of the drilling of a hole in the near wall of the airfoil. For example, the process condition may be an amount of light, an intensity of light, or both. During operation of the laser drill, plasma may form where the laser contacts and ablates the airfoil. The plasma may emit a large amount of relatively intense light directly to the ambient or from an opening at the start of the hole being drilled in the near wall. When, however, the laser has broken through the near wall of the airfoil, the amount and/or intensity of the light emanating from the hole may decrease beyond a predefined threshold, indicating that the laser drill has broken through the first wall of the airfoil. Notably, when the sensed process condition is an amount of light, an intensity of light, or both, the process condition may be sensed using, for example, the sensors described above with reference to FIGS. 3 and 4 configured to sense the process condition from a drilling point (i.e., where the plasma is formed or at the start of the hole being drilled) or from an ambient location.

In other exemplary aspects of the present disclosure, however, the process condition may be a frequency of shockwaves generated by the laser during operation of the laser drill. Additionally, or alternatively, the process condition may be a wavelength of shockwaves generated by the laser during operation of the drill. The shockwaves may be reflected from the hole being drilled in the near wall of the airfoil and detected using one or more sensors positioned proximate the hole. For example, the one or more sensors may be a microphone directed towards the hole, such as the sensor 66 depicted in FIGS. 3 and 4. In other exemplary aspects, however, any other process condition indicative of the progress or status of the laser drilling may be sensed. For example, in other exemplary embodiments, the method 150 may sense ultrasonic waves in the airfoil, in the surrounding air, or both.

Referring still to FIG. 9, the method 150 additionally includes at 154 sensing a change in the process condition indicative of a breakthrough of the laser through the near wall of the airfoil. The sensed change in the process condition at 154 may be a change in excess of a predefined threshold, wherein the predefined threshold is specific to the process condition, the type of hole being drilled, the airfoil, the location of the hole in the airfoil, and/or any other suitable parameter. Moreover, the predefined threshold may be greater than any expected noise or other deviation in the sensed process condition.

The exemplary method 150 additionally includes at 156 sensing the process condition for an amount of time subsequent to the sensed change in the process condition to collect additional data. By sensing the process condition at 156 subsequent to the sensed change in the process condition at 154, the exemplary method 150 may more accurately determine at 158 that the laser has broken through the near wall of the airfoil. More particularly, by sensing at 156 the process condition subsequent to the sensed change in the process condition at 154, an increased amount of data may be considered in making the determination at 158, as the data collected subsequent to the sensed change in the process condition at 154 may be processed and taken into consideration as well. For example, in such an exemplary aspect, the data may be analyzed and/or processed using various forms of logic to improve the precision and accuracy of the determination at 158. More particularly, in such an exemplary aspect, the method 100 may utilize, for example, PID (Proportional-Integral-Derivative) control logic, neural control logic, fuzzy control logic, square control logic, etc. Such a method may therefore reduce the risk of making an incorrect determination based on a single or small number of data points affected by noise in the sensed data or based on a data point sensed, e.g., between pulses of the laser.

The exemplary method 150 therefore may allow and may include sensing the process condition at 152 at a frequency much less than the pulse rate of the laser utilized by the laser drill, while still allowing for an accurate determination at 158. For example, as discussed above with reference to FIGS. 3 and 4, when the process condition is an amount of light, a camera having a shutter speed of about 20 frames per second may be used to sense the process condition and accurately determine when the laser has broken through the near wall of the airfoil.

Referring still to the exemplary method 150, in certain exemplary aspects, the amount of time the process condition is sensed at 156 subsequent to sensing a change in the process condition at 154 may be a fixed amount of time. For example, the amount of time may be 0.25 seconds, 0.5 seconds, 1 second, 1.5 seconds, 2 seconds, or more. Alternatively, the amount of time may be based on the frequency at which the process condition is sensed. For example, the amount of time at 156 may be an amount sufficient for the sensor to collect an additional 10 data points, an addition 25 data points, an additional 50 data points, or more. In other exemplary aspects, however, the amount of time the process condition is sensed at 156 may be less than 0.25 seconds, or the amount of time may be less than that required to collect an additional 10 data points. Alternatively, in other exemplary aspects, any other suitable criteria may be used to determine the appropriate amount of time. For example, the amount of time may be a variable amount of time required for the sensor to collect an additional 10 data points confirming that the laser has broken through the near wall of the airfoil.

Additionally, the exemplary method 150 may be incorporated into the exemplary method 100 described above with reference to FIG. 5. Accordingly, in other exemplary aspects of the present disclosure, the exemplary method 150 may include activating the back strike protection in the cavity of the airfoil, continuing to drill the hole in the near wall of the airfoil subsequent to sensing the change in the process condition at 154, etc. Moreover, it should be appreciated that the exemplary method 150 may be used to determine an initial breakthrough of the laser from laser drill, or in other exemplary aspects, for example when the laser drill is moving in a pattern relative to the airfoil, subsequent breakthroughs of the laser of the laser drill. Additionally, or alternatively, the exemplary method 150 may in other exemplary aspects be used to determine when the laser of the laser drill is no longer broken through, and has begun drilling into the near wall of the airfoil again. Such may be the case when the laser drill is moving in the spiral pattern depicted in FIG. 7, and the hole in the near wall of the airfoil is not yet fully complete (as depicted in FIG. 8(b)).

Referring now to FIG. 10, an exemplary method of drilling a hole in an airfoil is provided, or more particularly, an exemplary method 180 of determining that the drilling of a first hole in an airfoil is complete is provided. The exemplary method 180 includes at 182 activating a breakthrough detection for the first hole and at 184 determining that the laser drill has broken through the near wall of the airfoil. For the exemplary method 180 of FIG. 10, any suitable breakthrough detection may be used and any suitable method for determining the laser drill has broken through may be used. For example, in certain exemplary embodiments, the breakthrough detection activated at 182 and determining that a laser from the laser drill has broken through at 184 may incorporate or otherwise utilize one or more aspects of the exemplary method 150 discussed above with reference to FIG. 9.

The exemplary method 180 further includes at 186 calculating a time duration since determining that the laser drill has broken through the near wall of the airfoil at 184 and at 188 determining that the hole in the near wall of the airfoil is complete based on the calculated time duration. The time duration calculated at 186 may begin as soon as the breakthrough is determined at 184, and continue until the hole is determined to be complete at 188, or until the laser is no longer broken through the near wall of the airfoil. Additionally, determining that the hole is complete at 188 may include comparing the time duration to a predetermined amount of time, wherein the predetermined amount of time is dependent on, for example, the type of hole or pattern of hole being drilled, the airfoil, the location of the hole in the airfoil, or a combination thereof. In other exemplary aspects, however, the predetermined amount of time may be any other fixed or variable amount of time determined to be sufficient for the laser drill to substantially complete the drilling of the first hole.

In certain exemplary aspects, the laser drill may be moving in a pattern relative to the airfoil, such as the spiral pattern depicted in FIG. 7. In such an exemplary aspect, the method 180 may further include determining a plurality of breakthroughs of the laser from the laser drill through the near wall of the airfoil at 184, and at 186 calculating the time duration since when the laser most recently broke through the near wall of the airfoil. Additionally, in such an exemplary aspect, determining that the hole is complete at 188 may include comparing the time duration to a predetermined amount of time corresponding to the pattern. The predetermined amount of time corresponding to the pattern may be, for example, the amount of time for the laser drill to complete a full cycle of the pattern. Moreover, in the above exemplary aspect, the time duration calculated at 186 may refer only to the amount of time that the laser has been broken through and may stop when it is determined that the laser drill is drilling into the near wall of the airfoil again.

An illustration of such an exemplary aspect is depicted in the graph 220 of FIG. 11, wherein the X-axis is a drilling time for the hole in the near wall of the airfoil, and the Y-axis is a process condition, such as light intensity. As shown, when the process condition falls below a breakthrough threshold $B_T$ at 222, the first breakthrough is determined. Subsequent breakthroughs are determined at 224 and 226. When the time duration since the latest breakthrough exceeds a predetermined amount of time, the first hole is determined to be complete. For example, the hole may be determined to be complete at point 228. For this exemplary embodiment, the time duration is "reset" when it is determined at 225 that the laser drill is drilling into the near wall of the airfoil, then starts back at, or rather counting again from zero when the third breakthrough is determined at 226.

Notably, the exemplary graph 220 includes a certain amount of noise 232. However, in certain exemplary aspect of the present disclosure, determining the laser has broken through at 184 in the exemplary method 180 of FIG. 10, may include one or more aspects of the exemplary method 150 described above with respect to FIG. 9. Accordingly, the risk of falsely interpreting the noise 232 as a breakthrough may be minimized.

Referring now to FIG. 12, another exemplary method of drilling a hole in an airfoil is provided, or more particularly, another exemplary method 190 of determining that the drilling of a first hole in an airfoil is complete is provided. The exemplary method 190 may be used when, for example, the laser drill is moving in a pattern relative to the airfoil during the drilling of the first hole in the airfoil. In certain exemplary aspects, the pattern may be the spiral pattern depicted by FIG. 7.

The method 190 includes activating a breakthrough detection for the first hole at 192, determining a plurality of breakthroughs of the laser drill through the near wall at 194, and at 196 calculating a time duration between successive breakthroughs of the laser drill through the near wall of the airfoil. Additionally, the method 190 includes at 198 determining that the hole through the near wall is complete based on the time duration between successive breakthroughs. The time duration may include only the time that the laser from the laser drill is broken through the near wall of the airfoil. More particularly, the time duration may start once it is determined that the laser has broken through the near wall of the airfoil at 194 and stop once it is determined that the laser drill is drilling into the near wall of the airfoil again.

In certain exemplary aspects of the present disclosure, determining that the hole is complete includes comparing the calculated time duration to a predetermined amount of time. The predetermined amount of time may be dependent on, for example, the hole being drilled, the airfoil, the location of the hole in the airfoil, or a combination thereof. Additionally, or alternatively, the predetermined amount of time may correspond to the pattern the laser drill is moving in relative to the airfoil. For example, the predetermined amount of time may be the amount of time for the laser drill to complete a cycle of the pattern in which it is moving. Regardless, the predetermined amount of time may be an amount of time determined to be sufficient for the laser drill to complete the drilling of the first hole.

With reference to the exemplary graph 220 of FIG. 11, using the method 190, the hole may be determined to be complete at 198 of method 190 if the time duration between the second breakthrough 224 and when the laser drill begins drilling into the near wall of the airfoil again at 225 exceeds the predetermined amount of time for the hole being drilled. In such an exemplary aspect, the hole may be determined to be complete at the point 225 depicted in FIG. 11.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal language of the claims.

What is claimed:

1. A method for determining a breakthrough of a laser drill through a near wall of an airfoil comprising:
    drilling a hole in the near wall of the airfoil using the laser drill, the airfoil defining a cavity adjacent to the near wall and the laser drill utilizing a laser, the laser being a pulsed laser defining a pulse rate;
    sensing a process condition at a frequency less than the pulse rate of the pulsed laser;
    sensing a change in the process condition in excess of a predefined threshold, the sensed change indicative of a breakthrough of the laser through the near wall of the airfoil;
    subsequent to sensing the change in the process condition, sensing the process condition for an amount of time subsequent to the sensed change in the process condition to collect additional data; and
    subsequent to sensing the process condition for the amount of time, determining that the laser has broken through the near wall of the airfoil, wherein determining that the laser drill has broken through the near wall of the airfoil comprises confirming the sensed change in the process condition in excess of the predefined threshold was an actual breakthrough based on both the sensed change in the process condition in excess of the predefined threshold and the additional data collected.

2. The method as in claim 1, wherein determining that the laser has broken through the near wall of the airfoil based on both the sensed process condition and the additional data collected comprises processing the additional data collected subsequent to the sensed change in the process condition.

3. The method as in claim 1, further comprising:
    continuing to drill the hole in the near wall of the airfoil subsequent to sensing the change in the process condition.

4. The method as in claim 1, further comprising:
    engaging a back strike protection in the cavity of the airfoil.

5. The method as in claim 4, wherein the laser drill utilizes a confined laser beam, the confined laser beam comprising a laser beam within a fluid column, the method further comprising:
    disrupting the confined laser beam in the cavity of the airfoil using the back strike protection.

6. The method as in claim 1, wherein the process condition is an amount of light, an intensity of light, or both.

7. The method as in claim 6, wherein sensing the process condition comprises sensing the process condition at an ambient location.

8. The method as in claim 6, wherein sensing a process condition comprises sensing a process condition using a camera.

9. The method as in claim 8, wherein drilling the hole in the near wall of the airfoil using the laser drill comprises moving the laser drill in a pattern relative to the airfoil, and wherein the method further comprises
    moving the camera to correspond to the movement of the laser drill.

10. The method as in claim 1, wherein the process condition is a shockwave wavelength.

11. The method as in claim 1, wherein the process condition is a shockwave frequency.

12. The method as in claim 1, wherein drilling the hole in the near wall of the airfoil using the laser drill comprises moving the laser drill in a pattern relative to the airfoil.

13. The method as in claim 12, further comprising sensing a plurality of changes in the process condition indicative of the laser drill drilling into the near wall of the airfoil or having broken through the near wall of the airfoil.

14. The method as in claim 1, wherein the additional data collected includes additional data point of the process condition.

* * * * *